United States Patent
Niemz et al.

(10) Patent No.: US 6,972,101 B1
(45) Date of Patent: Dec. 6, 2005

(54) METHOD AND DEVICE FOR REGULATING THE COMPOSITION OF SOLUTION(S)

(75) Inventors: Frank-Gunter Niemz, Rudolstadt (DE); Wilhem Meyer, Rudolstadt (DE); Tanja Mainzer-Althof, Gelnhausen (DE)

(73) Assignee: Zimmer AG, Frankfurt (DE)

( * ) Notice: Subject to any disclaimer, the term of this patent is extended or adjusted under 35 U.S.C. 154(b) by 299 days.

(21) Appl. No.: 10/089,143

(22) PCT Filed: Sep. 29, 2000

(86) PCT No.: PCT/DE00/03409

§ 371 (c)(1),
(2), (4) Date: Jul. 16, 2002

(87) PCT Pub. No.: WO01/25512

PCT Pub. Date: Apr. 12, 2001

(30) Foreign Application Priority Data

| Oct. 6, 1999 | (DE) | ................................ 199 47 908 |
| Oct. 15, 1999 | (DE) | ................................ 199 49 727 |

(51) Int. Cl.$^7$ ........................ B29C 47/092; D01D 5/06; D01F 2/02

(52) U.S. Cl. .................. 264/178 F; 264/187; 425/135; 425/144; 425/382.2

(58) Field of Search ................................ 425/135, 140, 425/144, 145, 382.2, 404; 264/178 F, 187

(56) References Cited

U.S. PATENT DOCUMENTS

2,777,160 A * 1/1957 Rulison et al. ............ 264/40.1

FOREIGN PATENT DOCUMENTS

| DE | 44 11 815 A1 | 12/1995 |
| DE | 44 37 684 A1 | 4/1996 |
| DE | 690 22 421 T2 | 4/1996 |
| DE | 195 09 291 A1 | 9/1996 |
| DE | 197 04 609 A1 | 8/1998 |
| EP | 0 254 803 | 3/1987 |
| GB | 2217848 A | 4/1988 |
| WO | WO 94/28212 | 12/1994 |

OTHER PUBLICATIONS

Jürgen Falbe, et al. in Chemie, RÖMPP Lexikon, vol. 10, Georg Thieme Verlag, p. 3329 (1998).
E. Stocchi, Industrial Chemistry, vol. 1, Ellis Horwood, p. 101-102 (1990).
Derwent Abstract 76-45496X24.

* cited by examiner

*Primary Examiner*—Joseph S. Del Sole
(74) *Attorney, Agent, or Firm*—Marianne Fuierer; Steven J. Hultquist; Tristan A. Fuierer

(57) ABSTRACT

A method and device for regulating the composition of a solution(s) in the production of cellulosic mouldings. The device comprises multiple measuring devices for the measurement of non-optical properties of the solution. According to invention, by measuring the non-optical properties of the solutions and comparison of the measured value with a preset value, the composition(s) of the solution(s) can be controlled.

16 Claims, 1 Drawing Sheet

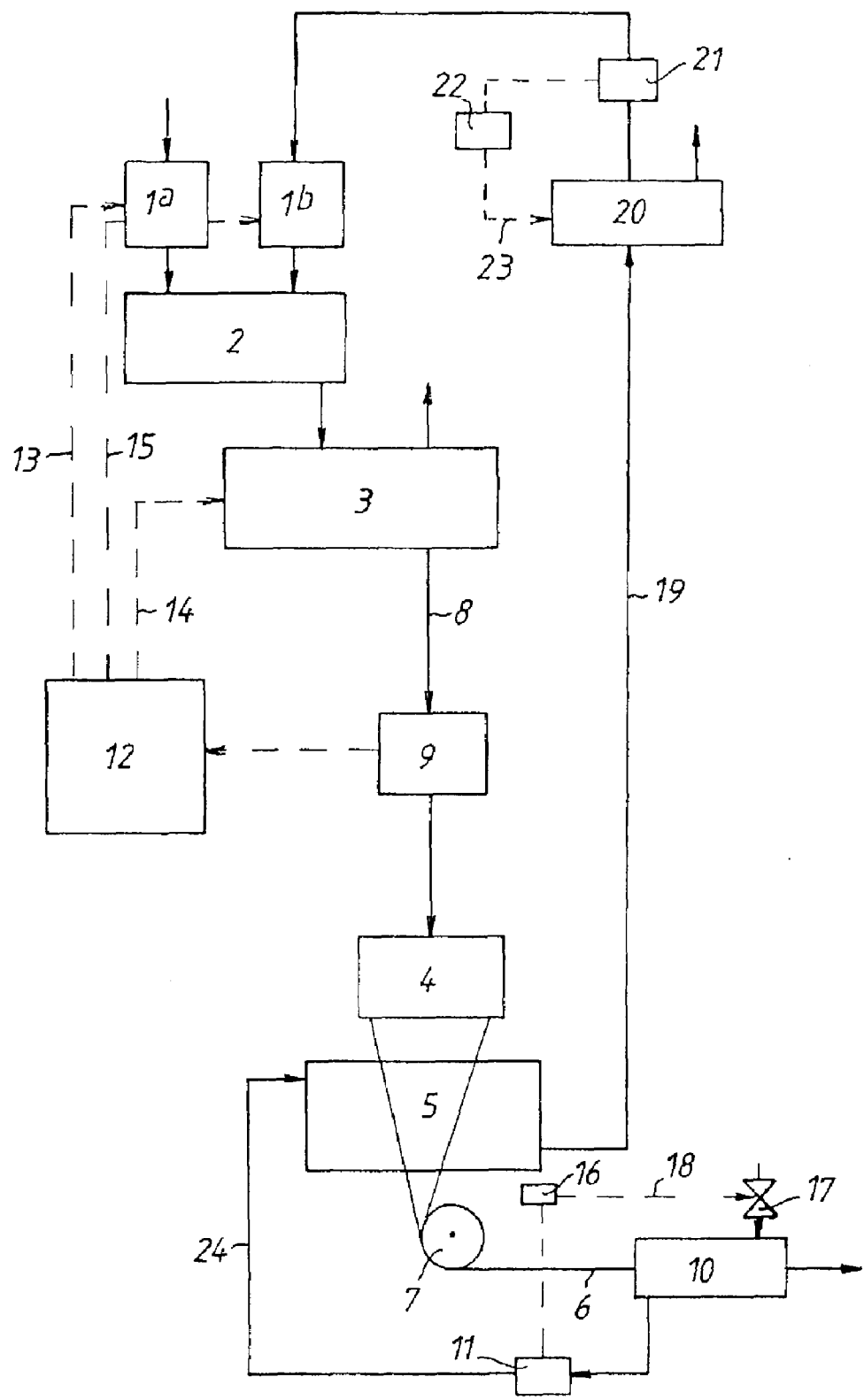

METHOD AND DEVICE FOR REGULATING THE COMPOSITION OF SOLUTION(S)

CROSS-REFERENCE TO RELATED APPLICATIONS

This application is filed under the provisions of 35 U.S.C. §371 and claims the priority of International Patent Application No. PCT/DE00/03409 filed Sep. 29, 2000, which in turn claims priority of German Patent Application Nos. 199 47 908.9 filed Oct. 6, 1999 and 199 49 727.3 filed Oct. 15, 1999.

FIELD OF THE INVENTION

The invention relates to a process for controlling the composition of solution(s) in the production of cellulosic shaped bodies, in which (a) cellulose pulp and an aminoxide containing water are mixed under formation of a suspension, (b) a cellulose solution is formed from the suspension under the evaporation of water, (c) the cellulose solution is extruded through an air gap into an aqueous precipitation bath and there coagulates to form mouldings, (d) the form mouldings were conducted through an aqueous washing solution, in which remaining aminoxide is washed out of the form mouldings, and (e) aqueous aminoxide solutions from stage (c) and/or (d) after concentration leads back to stage (a), in which a property or physical behavior of the solution is measured, and on the basis of the measured value the composition of the solutions are regulated.

The invention also relates to a device for the performance of this process with a mixing apparatus equipped with metering elements, a dissolving and evaporation device connected to the mixing apparatus, and an extrusion device connected via a line to the dissolving and evaporation device, with a downstream precipitation bath, at least one washing bath, containing a strongly diluted, aqueous aminoxide solution, a device for the measurement of one property of the solutions with the purpose of controlling their composition. When mention is made in general in the present invention of a property to be measured of the cellulose solution, this should also be understood to include a measurable physical behaviour of the solution.

The properties of the cellulosic mouldings manufactured in accordance with the aminoxide process, in particular the textile physical properties of the spun fibres and filaments, depend to a large degree on the composition of the extrusion solution. In order to maintain the optimum properties it is therefore desirable for the composition of the solution to be monitored and for fluctuations to be kept within narrow limits. In a continuous process like the present Aminoxide-Process its monitoring is of importance for an economic running. It is important, to measure also the concentration of the aminoxide solutions in stage (c), (d) and (e) and to regulate the composition of the solution.

BACKGROUND OF THE INVENTION

From WO 94/28212 the principle is known of taking a sample from time to time of the spinning solution flowing to the extrusion apparatus, and of measuring its refractive index, which at 60° C. should lie in the range from 1.4890 to 1.491, in order to obtain extrusion products with satisfactory properties. It is also known to keep the refractive index of the aminoxide solution in certain limits. Thereafter the refractive index of the aqueous aminoxide solution of the precipitation bath at 60° C. could lie in a range of 1,3644 to 1,3708, whereas for the concentrated aminoxide solution for the formation of the cellulose suspension the refractive index could lie in a range from 1,4620 to 1,4628, without activation of the metering elements or changings in the evaporation conditions. The monitoring of the refractive index of the solution in a more or less wide range does not allow the exact regulation of the composition of the solution. In addition this process does not work in case of solutions with strong lightabsorbtion and/or -diffraction.

The EP 0254 803 shows a process for the production of an aqueous, pure N-methylmorpholine-N-oxide-solution by reaction of Methylmorpholine with an aqueous Hydrogen peroxide, in which mixtures of Methylmorpholine and water were distillated, the azeotrope of Methylmorpholine and Water at temperatures from 60° C. to 100° C. was reacted with an aqueous Hydrogenperoxide-solution and the reaction solution is afterwards concentrated to the desired N-Methylmorpholine-N-oxide content. The concentration of the so obtained endproduct can be monitored through measurement of the refractive index or density, in which the endproduct is slightly yellow coloured and as unpurities, nearly undetectable amounts of peroxide, Methylmorpholine and carboxylic groups be present.

DESCRIPTION OF THE INVENTION

The objective on which the present invention is based is of creating a process for the manufacture of cellulosic mouldings according to the aminoxide process, in which the composition of the spinning solution can be precisely monitored. The regulation of the composition of the spinning solution should be more precisely than it is possible to do this on the basis of a range of refractive indices. In addition to this, a process is to be created for the manufacture of cellulosic mouldings according to the aminoxide process in which the composition of the spinning solution can be regulated with the shortest possible delay, so that any fluctuations which arise in the composition can be kept within narrow limits. Especially a process is to be created for the manufacture of cellulosic mouldings according to the aminoxde process, in which the composition of the different solutions occurring during the course of the process could be regulated even when the measurement of the refractive index is useless, because the light absorption or—diffraction of the solutions is too strong. Finally, a device is to be created to carry out the process, by means of which the changes in the composition of the solutions of the aminoxide process, in fact both the spinning solutions and the cellulose free, aqueous aminoxide solutions, could be kept in narrow limits or be eliminated. Further advantages can be derived from the following description.

This objective is achieved with the process described in the preamble, according to the invention, that a non-optical property of, at least one of the mentioned solutions is measured and the deviation(s) of the measured value from a certain reference-composition is used for regulating the composition(s) of this/these solution(s). Differing from the above-mentioned process including the measurement of the refractive index, according to the invention the deviation of the measured value is given in a narrow limit of tolerance. Deviations of the measured value to the reference value directly set off an intervention at the metering elements of the regulating circuit. The process according to the invention accordingly allows for a substantially stricter regulation of the solution composition than is possible, when the regulation is just activated, when the measured value is leaving the tolerance limit. The measurement of a non-optical property of the solutions does not require the transparency of the solutions for the wavelength used. So also spinning solutions, which contain defined proportions of additives, such as titandioxide, colour or filling material and aminoxide solutions obtained in course of the process, which are deep coloured because of the impurities, could be controlled and regulated in concern to their concentration.

According to the preferred embodiment of the process according to the invention, the non-optical property of the solution is selected from among the dielectricity constant, the (electric) conductivity, the microwave intensity and—speed, the density, the water content, and the ultrasonic speed. In Process transparent and non-transparent solutions could be controlled by the measurement of the same property, so the expenditure of measurement and regulation is minimized. The water content can be determined according to the Karl Fischer method.

According to the preferred embodiment of the process the temperature of the cellulose solution is measured at or shortly before or after the measurement of one of the mentioned properties of the solution and the measured value is compensated on the basis of the measured temperature.

Because the temperature of the spinning solution may variate, the measured values must be converted to the reference temperature at which the property values or behaviour values of the spinning solution of the reference composition are known, with which the measured values are to be compared. This reference temperature, to which the measured values are converted, is, for example, 50° C. or 60° C.

For preference the property of the solution is measured in-line. The in-line measurements allow not only for a rapid determination of the composition of the solution, but also reduce the safety risk engendered by the propensity to decomposition of the solution, due to the possible onset of runaway reactions in hollow spaces of the line (for example in the pipe for taking samples).

In one embodiment of the process according to the invention, recourse is made to the regulation of the composition of the solution in the metering of the components in stage (a), (b) respectively(d). If, for example, a change in the composition of the spinning solution is determined by measurement of the properties, intervention in the metering system of the components cellulose and/or solvent NMMO/H2O is necessary. For the correction of the composition of the precipitation bath solution, it could be necessesary to make a recourse of the metering system of the introduced washing solution or to change the dosage of water to the washing solution.

In another embodiment, recourse is made to the operating conditions of the stage (b) or/and stage(e) regulating the composition of the solution. If the results disclose a shift in the proportion of $NMMO/H_2O$, this can be corrected in the stage (b), by the water evaporation being throttled or increased in this stage. The concentration of the aqueous aminoxide solution to be led back in stage (a), can also be regulated by a recourse made in stage of concentration, respectively evaporation.

The objective is further resolved with the device according to the invention, referred to in the preamble, in that in line or in a container, containing the solution to be controlled, a measuring device for the measurement of a non-optical property of the solution is arranged, and that the measuring device together, in line with metering elements or the evaporation device forms a regulating circuit for regulation of the composition of the solution. The measuring device delivers a measured value of the solution, for example the dielectricity constant or the density, which is transformed into signals for the manipulation elements, for example the metering speed of metering elements or the change in the heat performance of the evaporation apparatus.

For preference, the measuring device comprises a device for measuring the temperature of the solution and for temperature compensation of the measured values of the measuring devices. The measuring device accordingly delivers measured values which are already temperature-compensated so that a direct comparison is possible with the property values of the spinning solution of the reference composition, related to a specific temperature.

The invention is described in greater detail hereinafter on the basis of the drawing. The single Figure shows the schematic flow chart of an embodiment of the device according to the invention.

Cellulose pulp containing water and a $NMMO/H_2O$ mixture are introduced via metering system 1 into a continuous pulping device 2. The device 2 may be a multi-shaft device, such as has been described in DE-C 198 37 210.8. Connected downstream of the device 2 is a dissolving device 3, in which the suspension formed in 2 is transformed into a solution by the addition of heat and under-pressure, under water evaporation. A suitable process for this is known from DE-A 44 41 468.8. Connected to the dissolving device 3 via a line 8 is an extrusion mould 4, through which the spinning solution is extruded via an air gap into a precipitation bath 5. Depending on the type of the extrusion mould and the operations which follow, films, fibres, filaments, or other moulding can be obtained. The moulding 6 acquired in this way is conducted via a withdrawal element 7 for a washing stage 10, in which remaining aminoxide is washed out of the moulding 6.

According to the invention, a measuring device 9 is arranged in the line 8 between the dissolving device 3 and the extrusion mould 4 for the measurement of a non-optical property, for example dielectricity constant or the density of the solution. The measuring device delivers a temperature-compensated signal to a microprocessor 12, which detects deviations from the reference solution and gives manipulation signals via signal line 13 to the metering element 1$^a$ for cellulose and via signal line 14 to the dissolving and evaporation device 2.

It is obvious from the drawing, that the washing solution coming from the washing stage 10 via line 24 is introduced into the precipitation bath container 5. A measuring device 11 in this line is detecting the composition of the used washing solution in line 24 and regulates via signal line 18 with the microprocessor 16 the valve 17 for the addition of water to washing stage 10. The used precipitation solution is introduced via line 19, which, is also containing a cleaning device (not shown), into a evaporation stage 20, in which the the solution is evaporated to a given aminoxide-concentration. The concentration of the evaporated solution is, via measurement of a property by a measuring device 21 and comparison of measured with the reference value via processor 22, transformed into a manipulating signal, which is used for manipulation of the evaporation conditions in evaporation stage 20 via signal line 23.

What is claimed is:

1. A process for the regulation of the composition of solution(s) for the manufacture of cellulosic mouldings, comprising:

(a) mixing cellulose pulp and water containing aminoxide to form a cellulosic suspension in a mixing apparatus equipped with metering elements;

(b) moving the cellulosic suspension from the mixing apparatus to a first evaporation device and evaporating water from the cellulosic suspension to form a cellulose solution;

(c) moving the cellulose solution from the first evaporation device to an extruding device and measuring a non-optical property of the cellulose solution for adjusting concentrations of the cellulosic suspension by means of the metering elements in stage (a) and/or the cellulose solution in the evaporation device of stage (b);

(d) extruding the cellulose solution through an air gap into a precipitation bath, which contains an aqueous aminoxide solution wherein the cellulose solution coagulates to form mouldings and removing at least some of the aqueous aminoxide solution from the precipitation bath to a second evaporation device for evaporating to a predetermined aminoxide concentration for reintroduction into the mixing apparatus;

(e) introducing and conducting the formed mouldings through a washing bath wherein an aqueous washing solution washes out remaining aminoxide from the mouldings; and (f) moving at least some of the aqueous aminoxide solutions-from the washing bath stage (e) and measuring at least one non-optical property in the aqueous aminoxide solution before the aqueous aminoxide solution is reintroduced into the precipitation bath, and wherein a measured values-of the non-optical properties is used for regulating the composition of the aqueous aminoxide solution according to the deviation of the measured value of at least one non-optical property in the aqueous aminoxide from a given value determined from a standard aqueous aminoxide composition wherein the measured non-optical property of the aqueous aminoxide solution is selected from the group consisting of: dielectricity constant, inductive conductivity, microwave absorption, density, water content and ultrasonic speed.

2. The process according to claim 1, wherein the temperature of the solution is measured at or shortly before or after the measurement of the non-optical property and the measured value for the non-optical property is compensated on the basis of the measured temperature.

3. The process according to claim 1, wherein the non-optical property is measured in-line.

4. The process according to claim 1, wherein adjustments are made to the components of the solutions in stage (a), (d), or (e).

5. The process according to claim 1, wherein adjustments are made to the operating conditions in the evaporation device of stage (b) and/or (f) for the regulation of the composition of the solutions.

6. A device used for the regulation of the composition of solution(s) for the manufacture of cellulosic mouldings, comprising:

a mixing apparatus containing at least two metering elements for introduction of composition components;

a dissolving and evaporation device communicatively connected to the mixing apparatus;

an extrusion device communicatively connected to the dissolving and evaporation device;

a precipitation bath downstream of the extrusion device and separated therefrom by an air gap;

at least one washing bath downstream from the precipitation bath;

a line connected between the washing bath and at least one of the metering devices, wherein the line further comprises a return evaporator;

a plurality of measuring devices for the measurement of a non-optical property and arranged to communicate with metering elements, the evaporator device and/or return evaporator via at least one regulation circuit for the regulation of the composition of the solutions contained in the mixing apparatus, the dissolving and evaporation device and/or the precipitation bath.

7. The device according to claim 6, wherein the device further comprises a temperature measuring device for measuring the temperature of the solution and for compensating the measured values of the measuring device according to the temperature.

8. The process according to claim 2, wherein the non-optical property is measured in-line.

9. The process according to claim 1, wherein the solution from step (e) is concentrated before the non-optical property is measured.

10. The process according to claim 3, further comprising measuring the temperature of the solutions of steps (d) and/or (e) at a time selected from the group consisting of:

before the measuring of the non-optical property, after the measuring of the non-optical property, and at approximately the same time as measuring the non-optical property, and wherein the measured value is compensated on the basis of the measured temperature.

11. The device of claim 6, further comprising a return line from the washing bath connected to the precipitation bath.

12. The device of claim 11, further comprising a measuring device positioned between the washing bath and precipitation bath.

13. The device of claim 7, wherein the measuring device measures a measurement selected from the group consisting of: a dielectricity constant, inductive conductivity, microwave absorption, density, water content and ultrasonic speed.

14. The device of claim 13, wherein each measuring device is measuring a different property.

15. The process according to claim 1, wherein the aqueous aminoxide solutions from stage (d) and (e) are measured for a non-optical property.

16. A process for the regulation of the composition of solution(s) for the manufacture of cellulosic mouldings, comprising:

(a) mixing cellulose pulp and a water containing aminoxide to form a cellulosic suspension;

(b) evaporating water from the cellulosic suspension to form a cellulose solution;

(c) extruding the cellulose solution through an air gap into an precipitation bath, which contains an aqueous solution wherein the cellulose solution coagulates to form mouldings;

(d) conducting the formed mouldings through an aqueous washing solution in which remaining aminoxide is washed out from the mouldings; and (e) removing at least some of the aqueous solutions from stage (c) and (d) for measuring a non-optical property and for regulating the composition of the aqueous solutions according to the deviation of the measured value of at least one non-optical property from a given value determined from a standard aqueous composition wherein the measured non-optical property of the aqueous solution is selected from the group consisting of: dielectricity constant, inductive conductivity, microwave absorption, density, water content and ultrasonic speed.

* * * * *

UNITED STATES PATENT AND TRADEMARK OFFICE
CERTIFICATE OF CORRECTION

PATENT NO. : 6,972,101 B1
APPLICATION NO. : 10/089143
DATED : December 6, 2005
INVENTOR(S) : Frank-Gunter Niemz et al.

It is certified that error appears in the above-identified patent and that said Letters Patent is hereby corrected as shown below:

Column 5, line 29, "values-of" should be -- value of --

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,972,101 B1
APPLICATION NO. : 10/089143
DATED : December 6, 2005
INVENTOR(S) : Frank-Gunter Niemz et al.

It is certified that error appears in the above-identified patent and that said Letters Patent is hereby corrected as shown below:

Column 5, line 25, "solutions-from" should be -- solution from --

Signed and Sealed this

Twenty-first Day of November, 2006

JON W. DUDAS
*Director of the United States Patent and Trademark Office*